United States Patent
Koll et al.

(10) Patent No.: US 7,057,583 B2
(45) Date of Patent: Jun. 6, 2006

(54) DISPLAY SYSTEM WITH DISPLAY ELEMENT STORAGE

(75) Inventors: Andrew Koll, Albany, OR (US); Eric T. Martin, Corvallis, OR (US); John Da Cunha, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 10/285,113

(22) Filed: Oct. 30, 2002

(65) Prior Publication Data

US 2004/0085271 A1    May 6, 2004

(51) Int. Cl.
*G09G 3/00*    (2006.01)
(52) U.S. Cl. .............................. 345/30; 345/76; 345/82
(58) Field of Classification Search ............ 345/76–83, 345/98, 544, 30–32, 204–213
See application file for complete search history.

(56) References Cited

U.S. PATENT DOCUMENTS

| 4,952,031 | A | * | 8/1990 | Tsunoda et al. ............... 349/24 |
| 5,612,798 | A | * | 3/1997 | Tuli ............................. 349/24 |
| 5,729,305 | A | * | 3/1998 | Robinson et al. ............... 349/2 |
| 5,945,972 | A | * | 8/1999 | Okumura et al. .............. 345/98 |
| 5,982,376 | A | | 11/1999 | Abe et al. |
| 6,181,353 | B1 | | 1/2001 | Kurisu |
| 6,229,506 | B1 | * | 5/2001 | Dawson et al. ............... 345/82 |
| 6,538,814 | B1 | * | 3/2003 | Hunter et al. ............... 359/449 |
| 6,680,579 | B1 | * | 1/2004 | Allen et al. ............. 315/169.3 |
| 2003/0201956 | A1 | * | 10/2003 | Anderson et al. ............. 345/82 |

FOREIGN PATENT DOCUMENTS

FR    2652185 A1 *    3/1991
WO    WO 200239417 A1 *    5/2002

* cited by examiner

*Primary Examiner*—Alexander Eisen

(57) ABSTRACT

A display system including a projector and a display. The projector is adapted to wirelessly transmit image information associated with an image to be displayed. The display includes a plurality of display cells that are configured to collectively display the image based on the image information transmitted by the projector. Each display cell includes a receiver, display element and storage device. The receiver is configured to wirelessly receive a portion of the image information, and the storage device is adapted to store a control signal corresponding to the received portion of the image information. The display element is configured to display the corresponding portion of the image in response to application of the control signal from the storage device.

28 Claims, 3 Drawing Sheets

Select (62)

DISPLAY SYSTEM WITH DISPLAY ELEMENT STORAGE

BACKGROUND

Various techniques exist for displaying still and moving images. One common technique involves use of a conventional, visible-light projector with a passive display screen. The projector acts as a central transmission source from which visible light is projected onto the screen to display an image or images. This display method is often effective, though it may be disadvantageous in certain applications.

In many projection systems, all of the optical energy to display an image is generated by the projector. This often requires use of expensive bulbs or lamps within the projector that can consume a significant amount of power and generate substantial heat. Many systems employ cooling fans to dissipate the heat. The cooling fans often produce noise, in addition to adding to the manufacturing expense and complexity of the system. In addition, it is common for projection systems such as that described above to employ mirrors, color wheels, polarizers and other optical components between the light source and the display screen. These components can increase the expense of the system and make it difficult to maintain image quality when producing images of varying size and/or brightness. In many applications, there may also be a need to maintain a clear optical path between the projector and the display screen during image display.

The issues discussed above may be addressed to some extent through use of active display methods, in which the display screen includes emissive elements that independently output visible light to form images. However, these systems commonly employ complicated networks of wired addressing connections to deliver image data from a centralized content source to the plural emissive elements of the display screen. The large number of connections that are required increase the risk of connection failure, and can add to the expense of the system.

SUMMARY

A display system is provided according to one aspect of the invention. The display system includes a projector that is configured to wirelessly transmit image information associated with an image to be displayed. The system also includes a display having a plurality of display cells that are configured to collectively display the image. Each display cell includes a receiver, display element and storage device. The receiver is configured to wirelessly receive a portion of the image information, and the storage device is adapted to store a control signal corresponding to the received portion of the image information. The display element is configured to display the corresponding portion of the image in response to application of the control signal from the storage device.

DETAILED DESCRIPTION

Figure 1:
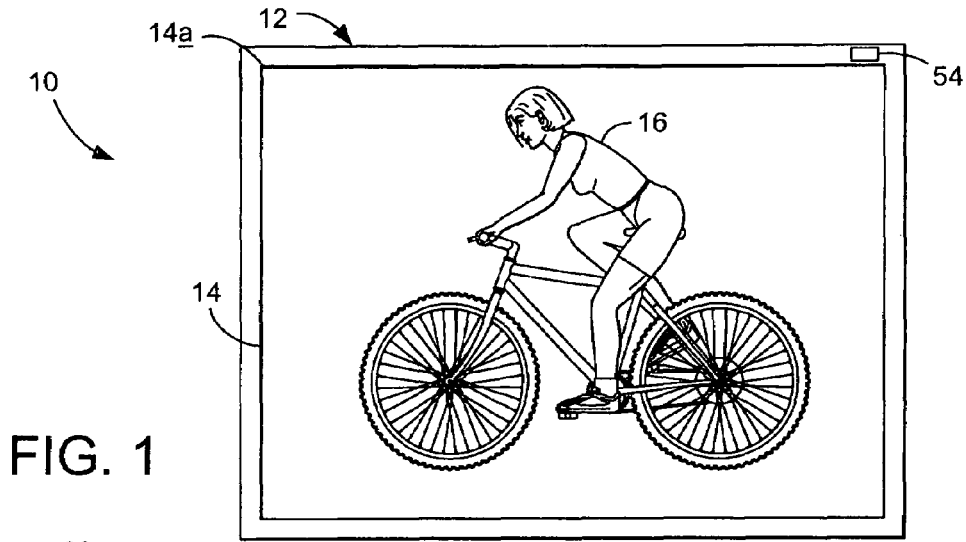
FIG. 1 is an isometric view of a display system according to an embodiment of the invention.

FIG. 1 depicts a display system 10 according to one embodiment of the invention. Display system 10 includes a display 12 configured to display viewable images, by emitting, transmitting and/or reflecting light, or through other methods. Display 12 typically includes or defines a planar area or structure, such as screen 14, at or upon which images, such as image 16, may be displayed. As used herein, "images" may include, or refer to, still images or video images. Screen 14 may be formed in any practicable size and shape, including non-planar shapes.

As depicted, display system 10 may also include a transmitting device, such as projector 18, which may be configured to transmit image information 20 and other signals to display 12. Projector 18 may, for example, generate and project visible light of sufficient intensity onto screen 14 to form image 16. Additionally, or alternatively, projector 18 may transmit image information and/or display control signals with low-intensity visible light (i.e., light that is insufficiently intense to provide a satisfactory viewable image) or without visible light. Projector 18 may, for example, transmit information and control signals to display 12 with radio frequencies, or with infrared light or non-visible frequencies of light. As explained below, display 12 may then use the information and/or control signals to control the visible light provided at display screen 14, using active methods or other display techniques.

Projector 18 typically is used as a programming source to program display with image information, which is stored at display 12 in a suitable form. Accordingly, projector 18 may also be referred to as a programming device. The stored information is used by display 12 to produce visible light to display an image or images, such as image 16. Image display may occur autonomously after the programming source (e.g., projector 18) has been removed from operative engagement (e.g., turned off) with display 12. The programming, storage and display functions will be described in detail below.

Examples of display systems, including various projectors and screens, may be found in METHOD AND APPARATUS FOR IMAGE AND VIDEO DISPLAY by William Allen, John Da Cunha, and Paul H. McClelland, U.S. Ser. No. 10/020,112, filed Dec. 14, 2001 and WRITEBOARD METHOD AND APPARATUS by Eric Martin and Andrew Koll, U.S. Ser. No. 10/143,257, filed May 9, 2002, the disclosures of which are incorporated herein by this reference, in their entireties and for all purposes.

Figure 2:
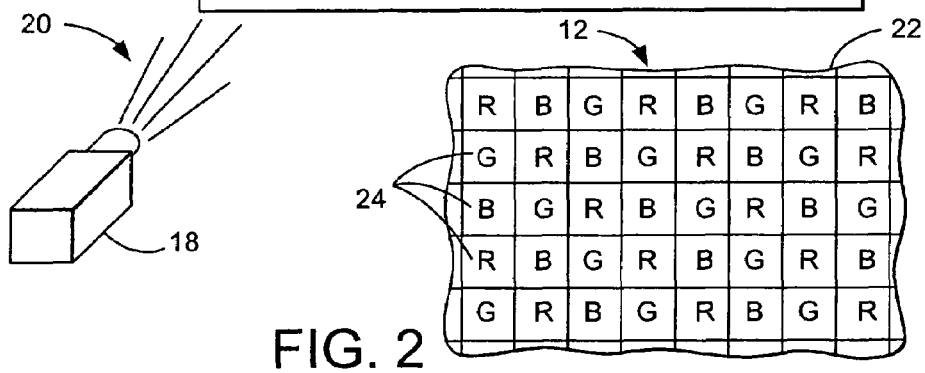
FIG. 2 is a partial plan view of an embodiment of a display that may be used with the display system of FIG. 1.

FIG. 2 depicts an exemplary configuration that may be used for display 12. Specifically, the figure depicts a portion of display 12, and shows that the display may be fabricated using a substrate 22, on which various microelectronic components may be formed or disposed. Other constructions may of course be employed, as desired and appropriate for a given application.

In any case, display 12 typically includes a plurality of display cells 24. In some embodiments, each display cell contributes a portion of the image being displayed at any given time on display 12. The depicted exemplary display includes red (R), green (G) and blue (B) cells arranged in a grid-like pattern. It should be appreciated that a wide variety of patterns or groupings may be employed for the different colors, instead of or in addition to the depicted grid pattern. The cells typically include emissive display elements configured to produce visible-spectrum light in the indicated colors (red, green and blue). As is well known in the display arts, relative intensities of red, green and blue light may be used to generate many different colors.

The depicted example of FIG. 2 is not intended to be limiting, as many different variations are possible. Colors other than red, green and blue may be used. Instead of multiple colors, a single color may be employed. Though the display often will include emissive elements, transmissive and/or reflective elements may be used instead of, or in addition to, the emissive elements. Also, the display cells and their components may be positioned in any practicable orientation relative to projector 18, and relative to the location(s) from which the display is to be viewed. For example, the cells may be adapted for use in front projection or rear projection configurations.

Figure 3:
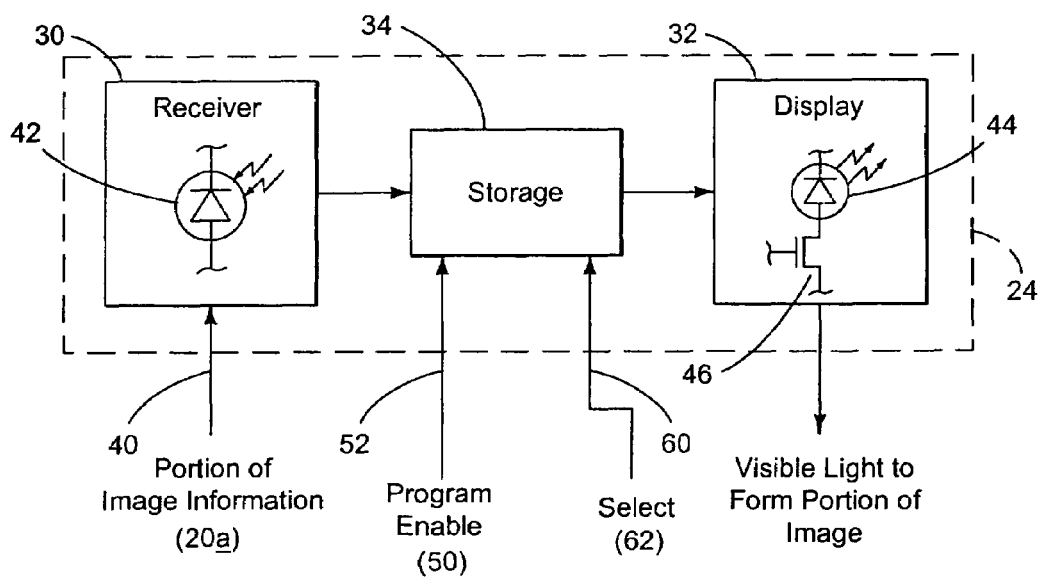
FIG. 3 is a schematic view of an embodiment of a display cell that may be used to implement the display shown in FIG. 1.

FIG. 3 depicts an exemplary display cell 24 according to an embodiment of the invention. As explained above, display 12 typically includes a plurality of such display cells. The display cells operate collectively to receive image information (e.g., image information 20 shown in FIG. 1) corresponding to an image to be displayed (e.g., image 16). Based on the received image information, display cells 24 collectively cause the image to be displayed. Typically, as shown in FIG. 3, each individual display cell receives and acts upon only a portion of the image information, and in turn outputs visible light forming only a portion of the displayed image. As will be explained below, system 10 may be configured to display a single static image or multiple images, such as a dynamic sequence of images (e.g., a video clip).

Display cell 24 typically includes a receiver 30 operatively coupled with a display element 32. Often it will also be desirable to configure the display cell with a storage device 34. When storage device 34 is employed, it typically is positioned in a data path between receiver 30 and display element 32, although other configurations may be employed, as appropriate in a given setting.

Display element 24 typically is wirelessly addressed. "Addressing," as used herein, includes accessing, controlling or providing data to a destination or destinations from a centralized source. In the depicted exemplary embodiment, the centralized source is projector 18, because projector 18 may be used as a central location from which all of the data (e.g., image information 20) pertaining to image 16 is transmitted. The data is transmitted from the projector to display 12, and the data (or portions thereof) may be received and acted upon at plural destinations (e.g., display cells 24).

More specifically, the depicted example is to an embodiment employing optically addressed display cells. As shown in FIG. 3, a portion 20a of the image information (e.g., image information 20) is applied to input 40 of display cell 24 via an optical transmission provided from projector 18. Input 40 may also be referred to as an addressing connection, because it provides a data/control pathway from an addressing location (e.g., projector 18) to an addressed location (e.g., display cell 24). Receiver 30 typically includes a light-receiving device, such as light-receiving diode (LRD) 42, which is configured to receive the incoming optical data.

LRD 42 may be configured to respond to specific frequencies of light. As indicated above, exemplary display 12 includes red, green and blue display cells 24. Accordingly, display 12 may be configured so that the LRDs in the red, green and blue display cells are actuated by unique frequencies of light. For example, image information for red display cells may be encoded using a first range of infrared frequencies, with information for green and blue cells being encoded in second and third infrared frequency ranges.

Typically, the image information is acted upon by the display cell so as to cause display element 32 to output visible-spectrum light to form part of the image that is displayed. Display 12 is commonly implemented as an active display, with the individual display elements (e.g., pixels) being formed with emissive components. For example, as shown, display element 32 may include an emissive component in the form of light-emitting diode (LED) 44. LED 44 is coupled in series with transistor 46, and is activated via application of a control signal to the gate of the transistor. Image information 20 may be used to control whether a particular LED is to be turned on or off for a given image, and/or may control the intensity of light produced by the LED.

In many configurations, it will be desirable to employ LEDs in a high-density arrangement over the surface area of screen 14. LEDs 44 and display elements 32 have been described herein as being controlled in response to image information so that they display a portion of an image. It should be understood that "displaying a portion of an image" will at times include the case where the display element or LED is not activated at all. Certain portions of the image may be black (no light required), and/or a given display element or LED may be turned off to achieve a desired regional color intensity.

Various methods may be employed to transmit image information 20 to the plural display cells 24 of display screen 14. A relatively narrow beam or beams of infrared light from projector 18 may be rastered over screen 14 according to some predetermined pattern, for example. Instead, projector 18 may project a relatively wide beam in order to simultaneously address all display cells 24 in parallel.

Whatever method is used, it will often be desirable to provide some mechanism or process for aligning projector 18 and display 12, so that appropriate portions of image information are provided to corresponding display cells 24. This may be accomplished by positioning projector 18 in a predetermined orientation relative to a known reference location on display 12, such as screen corner 14a. Projector 18, for example, may be adapted to project a sharply-focused beam of light. A technician would then move the projector and/or display until the beam was aimed at corner 14a or some other predetermined reference location on display 12. This alignment process may also be referred to as tuning or calibration of display system 10.

In many cases it will be desirable to provide display system 10 with a storage capability, to enable an image or images to be autonomously displayed by display cells 24. "Autonomous display," as used herein, refers to the ability of display 12 to display an image or images without an active addressing connection between the source of image information (e.g., projector 18) and display cells 24. Display cells 24 are able to continue to display their respective portions of image 16 after transmission of image information 20 is completed. This allows continued display of images, for example, after the projector is moved to another location or otherwise deactivated.

Typically, as indicated above, programming of images and subsequent display is achieved primarily or exclusively through a temporarily active optical interface between the projector and the screen. Absence of a wired addressing connection increases the portability of the programming device, and allows a single programming device to be shared among multiple display screens. Eliminating or simplifying the wired connections reduces the risks of physical failures associated with complicated electrical networks. The memory capability allows display of images without an active optical path between projector and screen, thus eliminating the need to maintain an unobstructed path during image display.

Various controls signals may be used to control the functioning of storage device 34. One such signal is a program enable signal 50, which may be applied to storage device 34 along program enable input 52. Typically, the program enable signal is provided as part of the wireless transmissions generated by projector 18. The program enable signal may be applied via a central display controller 54 (FIG. 1), or may be applied to display cells 24 directly without intervening reception/processing by controller 54 or other devices. As discussed below, controller 54 may perform various tasks in connection with the programming, storage and display functions described herein.

Assertion of the program enable signal allows the contents of storage device 34 to be programmed. For example, programming and playback for an individual static image may proceed as follows: image information 20 corresponding to the image is wirelessly transmitted by projector 18 so that respective portions of the image information are received at corresponding display cells 24. While the addressing connection (e.g., input 40) for each display cell 24 is active, that is, while the image information is being transmitted, the program enable signal may be asserted globally, and correspondingly communicated to each storage device 34 via its program enable input 52. This causes each storage device 34 to store a control signal corresponding to the portion of image information 20$a$ received via input 40. The control signal may be applied to display element 32 to cause LED 44 to activate or deactivate, and/or to otherwise control the light produced by LED 44, depending on what is required at that individual display element. The displayed image may be reprogrammed at any time by changing the transmitted image information and re-asserting the program enable signal. Furthermore, the program enable signal may be communicated to less than all display cells so as to program (record) only part of an image.

Additionally, the storage feature may be designed to accommodate storage of data relating to more than one image, for example, data pertaining to a series of sequentially related images may be stored. Multiple images may be sequentially displayed during playback to provide a dynamic video display. Typically, multiple image capability is accomplished by configuring each storage device 34 of each display cell 24 with multiple storage locations, such that each storage location corresponds to one of the plurality of images.

In multiple-image configurations, various control signals may be used to effectuate programming of storage device 34 and autonomous display of images. An exemplary control scheme will now be explained with reference to FIGS. 3–5. As with single image operation, a program enable signal may be supplied to display cell 24 along program enable input 52 (FIG. 3). Each display cell 24 may also be provided with a select input 60 along which a select signal 62 may be applied to the display cell.

As explained in more detail below, select signal 62 may select from among the plural storage locations of storage device 34. During programming of display cell 24, select signal 62 selects the particular storage location that is to be programmed. Then, similar to the single-image mode described above, assertion of the program enable signal causes the selected storage location to be programmed according to the corresponding image data addressed to the display cell via input 40.

Figure 5:
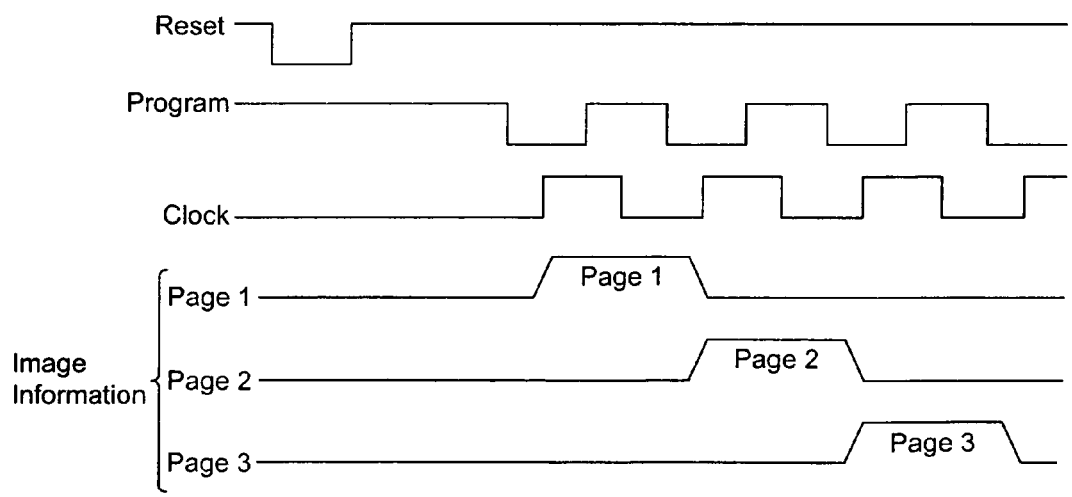
FIG. 5 is an exemplary waveform diagram depicting exemplary signals that may occur during programming of the display system shown in FIG. 1.

This technique may be used to program all of the available storage locations within storage device 34. To do this, the select signal may be varied to select the different storage locations, and the image information applied via input 40 varies accordingly to cause the storage locations to be programmed with the desired image data. The program enable signal may be intermittently asserted as the image information and select signals vary. Typically, the system incrementally steps through all of the available storage locations in sequence. FIG. 5 depicts exemplary waveforms and timing of the different signals that may be applied to display cell 24. As will be discussed below, the program and select (clock) signals may be applied to display cells 24 with the aid of a centralized device provided at display 12 (e.g., controller 54). In such a case, it will at times be desirable to employ a reset or clear signal, as shown in FIG. 5. This signal will be explained below with reference to controller 54. As shown in FIG. 5, in multiple image configurations, the individual images may be referred to as "pages."

It should again be emphasized that display 12 includes multiple display cells 24. Typically, the program enable and select signals are globally applied to the display cells, such that these signals at any given time have the same value for each cell. In contrast, the portion of image information applied to and stored at each cell will typically vary from cell to cell. In a ten-second video clip, for example, the system would have to store 600 images, assuming a frame rate of 60 images per second. During programming of such a system, the first of the 600 images could be programmed by programming the first storage location in each display cell 24, using global application of the program enable and select signals to all of the display cells, and particularized application of data (image information) to each receiver 30. The second image would then be programmed by accessing the second storage location of each cell, and so on, until all 600 images were programmed. A globally applied select signal could then be used to autonomously play back the individual images (pages) of the video sequence.

Figure 4:
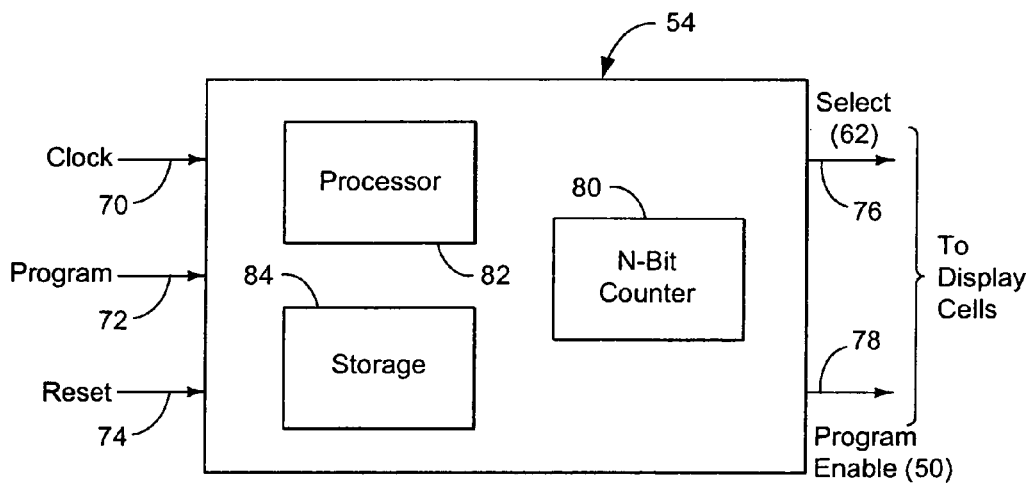
FIG. 4 is a schematic view of an embodiment of a display controller that may be used with the display shown in FIG. 1.

As shown in FIGS. 1 and 4, display 12 may be configured with a centralized device, such as controller 54, to facilitate the programming and display functions described above. More particularly, controller 54 may be employed to apply various global signals to display cells 24 during the programming of the display cells, and/or during display of images by display cells 24.

As shown in FIG. 4, exemplary controller 54 may include a clock input 70, program input 72 and reset input 74, and a select output 76 and program output 78. Controller 54 may also include a counter 80 to aid in selecting the multiple available storage locations at each display cell 24.

Typically, during programming, the programming device (e.g., projector 18) provides various signals to inputs 70, 72 and 74. For example, an enable signal may be applied from the programming device to clock input 70. This, in turn, may increment the value maintained at counter 80. The counter value may be output to display cells 24 via select output 76, to provide the above-described select signal (e.g., select signal 62) that selectively activates the corresponding storage locations within display cells 24. A reset signal may be applied to reset input 74 in order to reset counter 80. Also, the program enable signal described above may be applied to controller 54 (e.g., via input 72), such that the program enable signal may then be globally distributed to the plurality of display cells 24 via program output 78.

Controller 54 may also be configured to control autonomous display of an image or images by display 12. For example, in a multiple-image configuration, each display cell 24 includes a storage device 34 with multiple storage locations, as previously described. When the first storage location at each display cell 24 is activated, a corresponding control signal is applied to each display element 32, which causes the display elements to collectively display the first image. The next image is displayed when the second storage location at each cell is activated, and so on. Controller 54 may be configured so that counter 80 steps through a range of values, to cause controller 54 to globally drive all of display cells sequentially through the stored images. In this case, the global select signal may be applied via select output 76, based on changing values at counter 80. As shown, controller 54 may include a processor 82 and a storage 84 to facilitate the described programming and display functions.

Figure 6:
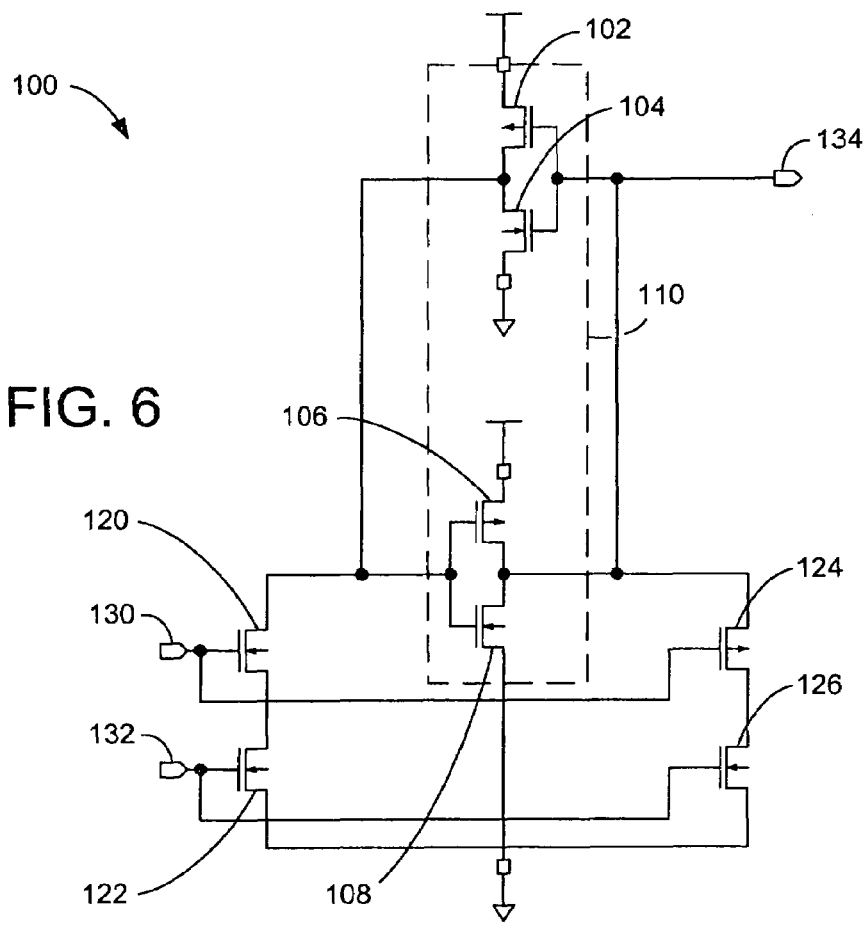
FIG. 6 is a schematic diagram of an embodiment of a storage circuit that may be used to provide the display system of FIG. 1 with a memory capability.

FIG. 6 depicts an example of a memory circuit 100 that may be implemented within storage device 34. Exemplary circuit 100 includes transistors 102 and 104, which are coupled in series, and transistors 106 and 108, also coupled in series. Collectively, these four transistors form a cross-coupled inverter 110. Transistors 120 and 122 are coupled in series, and are connected to one side of cross-coupled inverter 110. Transistors 124 and 126 are coupled in series, and are connected to the other side of the cross-coupled inverter. Input lead 130 receives image information from receiver 30, and is connected to the gates of transistors 120 and 124. Input lead 132 receives the program enable signal described above, and is connected to the gates of transistors 122 and 126.

When the voltage on input lead 130 is pulled high, enabling program input 132 causes the voltage on the left side (in FIG. 6) of cross-coupled inverter 110 to be pulled low. This, in turn, sets the control signal at output lead 134 to a high level. This high output is applied from output lead 134 to display element 32 (FIG. 3), in order to turn LED 44 on, and/or maintain it in a turned-on state. Conversely, when the voltage on input lead 130 is pulled low, enabling program input 132 causes the voltage on the right side of cross-coupled inverter 110 to be pulled low. This pulls the signal at output lead 134 low, which turns off LED 44, and/or maintains it in a turned-off state. In other words, asserting the program enable signal causes the data received from receiver 30 to be latched from input lead 130 to output lead 134. Typically, the latched-in level existing at output lead 134 can only be changed (reprogrammed) while the program enable signal is being asserted at program input 132. Otherwise, the latched-in value is stored at output lead 134, which enables the autonomous operation of storage device 34 and display element 32.

Figure 7:
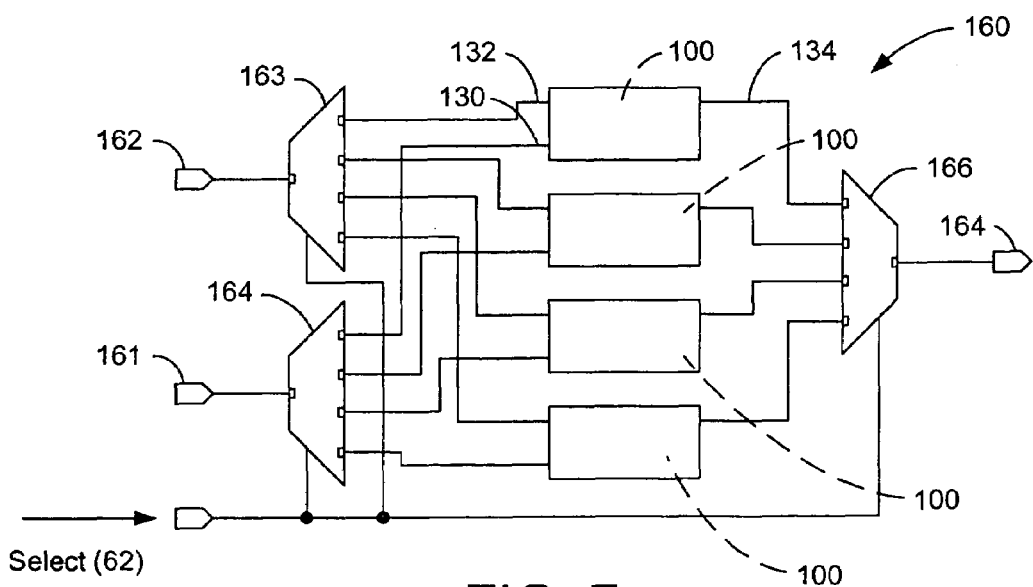
FIG. 7 is a schematic diagram of another embodiment of a storage circuit that may be used to provide the display system of FIG. 1 with a memory capability.

Several memory circuits such as that just described may be combined to provide storage device 34 with multiple storage locations (e.g., multiple bits of storage capacity). FIG. 7 is a schematic representation of an exemplary storage circuit 160 having such a configuration. In the depicted example, four memory circuits 100 may be employed, to provide four bits of storage capacity. It should be appreciated, however, that the depicted exemplary circuit may be modified to provide any practicable amount of storage capacity.

In FIG. 7, the image information and program enable signals may be respectively provided to circuit 160 via input leads 161 and 162, and the output used to drive the LED is provided on output lead 164. The input signals on the input leads (e.g., the program enable signal and the image information supplied from receiver 30) are coupled selectively with memory circuits 100 via demultiplexers 163 and 164, which may be controlled in response to application of the previously described select signal 62. Specifically, the demultiplexers pass the signals to the inputs (e.g., inputs 130 and 132) of a selected one of the memory circuits 100, based on the value of the select signal. Select signal 62 may also control output multiplexer 166, which couples the output (e.g., output lead 134) of the activated memory circuit 100 to the overall output 164.

While embodiments of the present invention have been particularly shown and described, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A display system, comprising:
    a projector configured to wirelessly transmit image information corresponding to an image to be displayed; and
    a display including a plurality of display cells configured to collectively display the image, where each display cell includes:
        a receiver configured to wirelessly receive a portion of the image information;
        a storage device configured to store a control signal corresponding to the portion of the image information; and
        a display element configured to display a corresponding portion of the image in response to application of the control signal,
    where each display cell is configured so that contents of the storage device are changeable upon application of a program enable signal from the projector to the display.

2. The display system of claim 1, where the projector is configured to transmit the image information to the display cells via light frequencies that are at least partly non-visible.

3. The display system of claim 1, where the display cells are configured to collectively display multiple images based on the image information, and where each storage device includes multiple storage locations that each correspond to one of the multiple images.

4. The display system of claim 3, where the display further includes a controller operatively coupled with the display cells, the controller being configured to control which of the multiple images is to be collectively displayed by the plurality of display cells.

5. The display system of claim 3, where the display further includes a controller operatively coupled with the display cells, the controller being configured to apply a global select signal to all of the display cells, which determines which of the multiple storage locations within each storage device is activated.

6. The display system of claim 3, where the display cells are configured to autonomously display the multiple images after programming of the storage devices, said autonomous display being independent of any simultaneously active delivery of image information to the display cells.

7. The display system of claim 3, where the projector is configured to apply a select signal to the display to selectively step through the storage locations of each storage device and thereby facilitate programming of the display cells with the image information corresponding to the multiple images.

8. The display system of claim 1, where each of the display elements includes an emissive component.

9. The display system of claim 8, where the emissive component is a light-emitting diode.

10. The display system of claim 1, where each display cell is addressable with image information independent of any wired addressing interconnection between the display cells.

11. The display system of claim 1, where the display cells are configured to autonomously display the image after programming of the storage devices, said autonomous display being independent of any simultaneously active delivery of image information to the display cells.

12. A method of displaying an image, comprising:
wirelessly transmitting image information from a source to an active display having a plurality of display cells, where the image information corresponds to the image to be displayed;
storing, in a discrete storage device at each display cell of the active display, a particularized control signal that corresponds to a portion of the image information; and
selectively activating, at each display cell, a display element associated with the display cell based on the particularized control signal stored at such display cell, where each display element corresponds to a portion of the image to be displayed, and where collective operation of the display elements causes display of the image.

13. The method of claim 12, where the display elements are selectively activated after completion of the wireless transmission of image information from the source to the active display.

14. The method of claim 12, where the image information corresponds to multiple images, and where the storing step includes storing control signals corresponding to the multiple images, and where the display elements at each display cell are selectively activated based on the stored control signals so as to cause the display elements to display the images.

15. A display, comprising:
a plurality of display cells configured to collectively display an image based on image information supplied to the display cells, each display cell including:
optical receiver means for optically receiving a portion of the image information;
storage means operatively coupled with the optical receiver means and configured to indefinitely hold a control signal corresponding to the portion of the image information received; and
display element means for displaying a portion of the image in response to application of the control signal,
where the plurality of display cells are configured to autonomously display the image after transmission of image information to the optical receiver means has been completed, and where such autonomous display is independent of any contemporaneous active delivery of image information to the display cells.

16. A substrate, comprising:
a plurality of display cells configured to collectively display an image based on image information supplied to the display cells, each display cell including:
a receiver configured to receive a portion of the image information;
a storage device operatively coupled with the receiver and configured to indefinitely store a control signal corresponding to the received portion of the image information, where the control signal is changeable upon application of a program enable signal from a portable programming device; and
a display element adapted to display a portion of the image in response to application of the control signal.

17. The substrate of claim 16, where each receiver is configured to wirelessly receive the portion of the image information.

18. The substrate of claim 17, where each receiver is configured to be addressed via non-visible optical transmission.

19. The substrate of claim 18, where each receiver is configured to be optically addressed via infrared transmission.

20. The substrate of claim 16, where the display cells are configured to collectively display multiple images based on the image information, and where each storage device includes multiple storage locations that each correspond to one of the multiple images.

21. The substrate of claim 20, further comprising a controller operatively coupled with the display cells, the controller being configured to control which of the multiple images is to be collectively displayed by the plurality of display cells.

22. The substrate of claim 20, where the display cells are configured to autonomously display the multiple images after programming of the storage devices, said autonomous display being independent of any simultaneously active delivery of image information to the display cells.

23. The substrate of claim 16, where each of the display elements includes an emissive component.

24. The substrate of claim 23, where the emissive component is a light-emitting diode.

25. The substrate of claim 16, where each of the storage devices is adapted so that its contents are changeable upon application of a global program enable signal to the plurality of display cells.

26. The substrate of claim 16, where each display cell is addressable with image information independent of any wired interconnection between the display cells.

27. The substrate of claim 16, where the display cells are configured to autonomously display the image after programming of the storage devices, said autonomous display being independent of any active delivery of image information to the display cells.

28. An electronic display device configured to display an image based on image information optically transmitted to the electronic display device, the electronic display device comprising:

a plurality of receivers, each receiver being configured to receive a portion of the image information;

a plurality of discrete storage devices, each storage device being operatively coupled with one of the receivers and configured to store a control signal based on the portion of the image information received by such receiver; and a plurality of display elements, where each display element is configured to display a portion of the image in response to application of the control signal from one of the storage devices, such that collective operation of all of the display elements causes display of the image.

* * * * *